US007702611B2

(12) United States Patent
Chi et al.

(10) Patent No.: US 7,702,611 B2
(45) Date of Patent: Apr. 20, 2010

(54) METHOD FOR AUTOMATICALLY PERFORMING CONCEPTUAL HIGHLIGHTING IN ELECTRONIC TEXT

(75) Inventors: Ed H. Chi, Palo Alto, CA (US); Lichan Hong, Mountain View, CA (US); Stuart K. Card, Los Altos Hills, CA (US)

(73) Assignee: Xerox Corporation, Norwalk, CT (US)

( * ) Notice: Subject to any disclaimer, the term of this patent is extended or adjusted under 35 U.S.C. 154(b) by 820 days.

(21) Appl. No.: 11/031,641

(22) Filed: Jan. 7, 2005

(65) Prior Publication Data

US 2006/0156222 A1 Jul. 13, 2006

(51) Int. Cl.
*G06F 17/30* (2006.01)

(52) U.S. Cl. .................................... 707/1; 707/3; 707/5

(58) Field of Classification Search ...................... 707/1
See application file for complete search history.

(56) References Cited

U.S. PATENT DOCUMENTS

| | | | | |
|---|---|---|---|---|
| 5,835,905 A | 11/1998 | Pirolli | 707/3 |
| 6,598,047 B1 | 7/2003 | Russell et al. | |
| 7,162,465 B2 * | 1/2007 | Jenssen et al. | 707/1 |
| 7,343,365 B2 * | 3/2008 | Farnham et al. | 707/1 |
| 2002/0035563 A1 * | 3/2002 | Suda et al. | 707/7 |
| 2002/0083101 A1 | 6/2002 | Card et al. | |
| 2002/0143940 A1 | 10/2002 | Chi et al. | |
| 2004/0139400 A1 | 7/2004 | Allam et al. | |
| 2005/0251408 A1 * | 11/2005 | Swaminathan et al. | 705/1 |

FOREIGN PATENT DOCUMENTS

GB 2 332 544 A 6/1999

OTHER PUBLICATIONS

Chris Olston, Ed H. Chi. ScentTrails: Integrating Browsing and Searching on the Web. ACM Transactions on Computer-Human Interaction, vol. 10, Part 3, pp. 177-197. Sep. 2003. ACM Press.
Autonomy. Conceptual Search. 2004. http://www.autonomy.com/c/content/Products/IDOL/f/Conceptual_Search.

(Continued)

*Primary Examiner*—Charles Rones
*Assistant Examiner*—Mellissa M Chojnacki
(74) *Attorney, Agent, or Firm*—Fliesler Meyer LLP

(57) ABSTRACT

User's interests can be explicitly determined via keywords that the user specifies, and/or are implicitly constructed from user browsing and reading activity. User interests may be expressed as an interest profile. Conceptual keywords related to user interests are selected by combining spreading activation and word co-occurrence, by latent semantic analysis, or other methods.

One embodiment automatically highlights sentences and other information that contain conceptual keywords related to user interests. Highlights can be activated when the user directly performs a keyword search or index search, or the invention can generate information reflecting user interests, apply it to the text, and generate and display highlights. One embodiment includes an algorithm for computing a conceptual keyword vector through an iterative spreading activation process also employing word co-occurrence. A conceptual index of the text may be created and then combined with conceptual highlighting.

12 Claims, 8 Drawing Sheets

OTHER PUBLICATIONS

Card, S. K., Hong, Lichan, Mackinlay, Jock D., Chi, Ed H. 3Book: A 3D Electronic Smart Book. In Proceedings of the Advanced Visual Interface (AVI2004), pp. 303-307. Gallipoli, Italy.

Chi, E. H., Pirolli, P., Chen, K., and Pitkow, J. Using information scent to model user information needs and actions on the Web. Proc. of the ACM Conference on Human Factors in Computing Systems, CHI 2001 (pp. 490-497). 2001.

Chi, E. H., A. Rosien, J. Heer. LumberJack: Intelligent Discovery and Analysis of Web User Traffic Composition. In Proc. ACM-SIGKDD Workshop on Web Mining for Usage Patterns and User Profiles (WebKDD 2002), pp. —. ACM Press, Jul. 2002. Edmonton, Canada.

Chi, E. H. et al. The Bloodhound Project: Automating Discovery of Web Usability Issues using the InfoScent(tm) Simulator. In Proc. of ACM CHI 2003 Conference on Human Factors in Computing Systems, pp. —. ACM Press, Apr. 2003. Fort Lauderdale, FL.

Chi, Ed H., Lichan Hong, Julie Heiser, Stuart K. Card. eBooks with Indexes that Reorganize Conceptually. In Proceedings of the Human Factors in Computing Systems Conference (CHI2004) Conference Companion, pp. —. ACM Press, 2004. Vienna, Austria.

Google. Google Toolbar, http://toolbar.google.com/. 2004.

Paynter, Gordon W., Ian H. Witten, Sally Jo Cunningham, George Buchanan. Scalable browsing for large collections: a case study, Proc. of the fifth ACM conference on Digital libraries, p. 215-223, Jun. 2000, San Antonio, Texas.

Pitkow, J., H. Schütze, T. Cass, R. Cooley, D. Turnbull, A. Edmonds, E, Adar, T. Breuel. Personalized Search. Commun. ACM, 45(9), pp. 50-55. 2002.

Remde, J.R., Gomez, L.M., and Landauer, T.K. SuperBook: An automatic tool for information exploration—hypertext? In Proc of Hypertext '87, pp. 175-188. ACM Press, 1987.

Schüetze, Hinrich. The hypertext concordance: a better back-of-the-book index. Proc. Computerm '98, pp. 101-104, 1998.

Schuetze, H., Manning, C. Foundations of Statistical Natural Language Processing. Cambridge, MA: MIT Press, 1999. (Chapter 5).

Ed H. Chi, Lichan Hong, Michelle Gumbrecht, Stuart K. Card. ScentHighlights: Highlighting Conceptually-Related Sentences During Reading. International Conference on Intelligent User Interfaces, Jan. 9-12, 2005, San Diego.

Chi, Ed H., et al., ScentIndex: conceptually reorganizing subject indexes for reading, IEEE Symposium on Visual Analytics Science and Technology (VAST 2006), Baltimore, MD, Oct. 31-Nov. 2, 2006, pp. 159-166, Piscataway NJ: IEEE.

Chi, Ed H., et al., eBooks with indexes that reorganize conceptually, Extended Abstracts of the ACM International Conference on Human Factors in Computing Systems (CHI 2004), Vienna, Austria, Apr. 24-29, 2004, pp. 1223-1226, NY: ACM.

Shepherd, Michael, et al., Browsing and keyword-based profiles: a cautionary tale, System Sciences 2001, Proceedings of the 34th Hawaii International Conference on System Sciences, Jan. 3-6, 2001, pp. 1365-1373, Piscataway NJ: IEEE.

He, Ben, et al., A study of parameter tuning for term frequency normalization, Proceedings of the 12th International Conference on Information and Knowledge Management, Nov. 3-8, 2003, New Orleans.

Unit vector, http://en.wikipedia.org/wiki/Unit_vector.

* cited by examiner

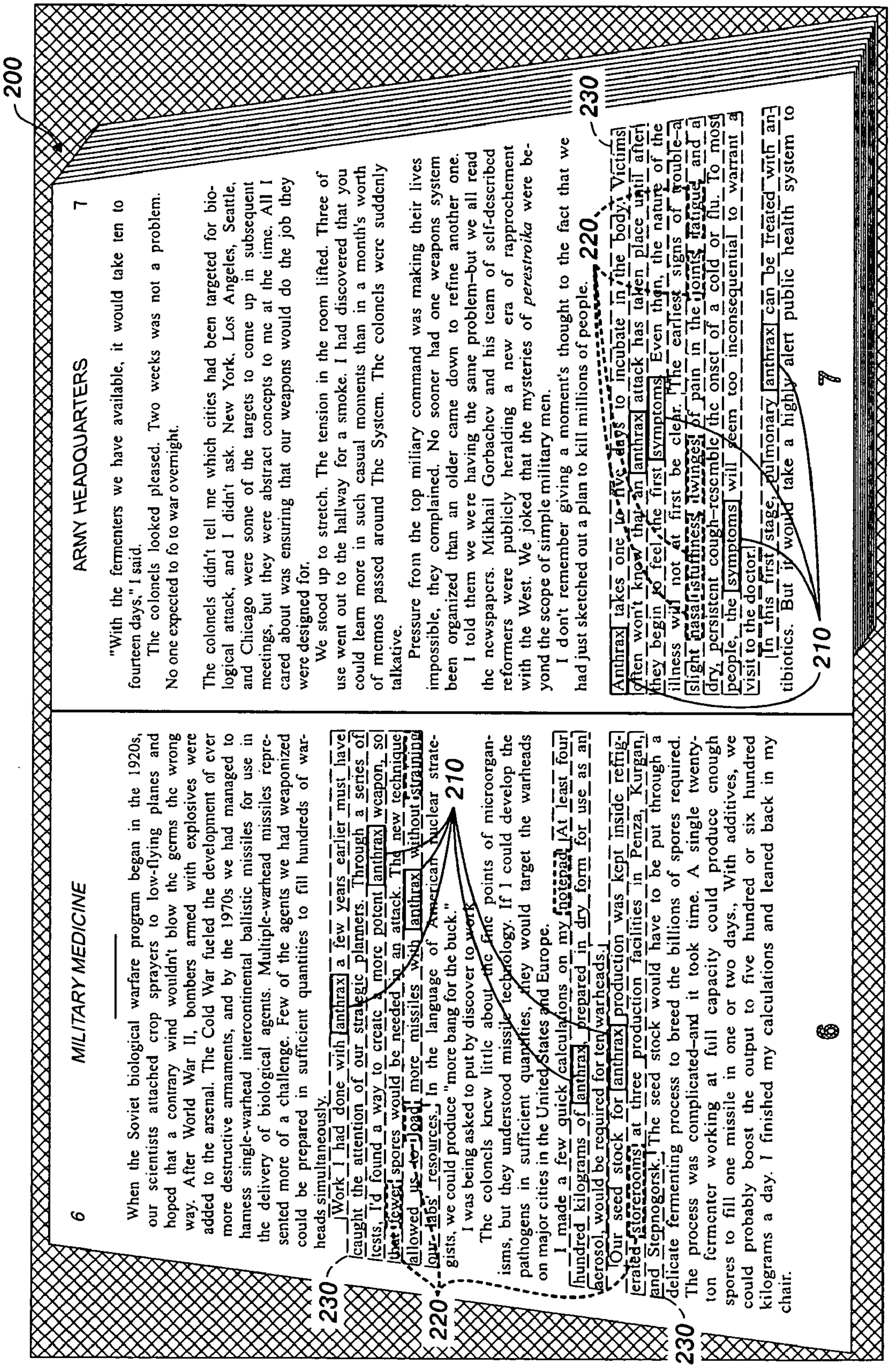

FIG. 2

MILITARY MEDICINE

When the Soviet biological warfare program began in the 1920s, our scientists attached crop sprayers to low-flying planes and hoped that a contrary wind wouldn't blow the germs the wrong way. After World War II, bombers armed with explosives were added to the arsenal. The Cold War fueled the development of ever more destructive armaments, and by the 1970s we had managed to harness single-warhead intercontinental ballistic missiles for use in the delivery of biological agents. Multiple-warhead missiles represented more of a challenge. Few

FIG. 3A

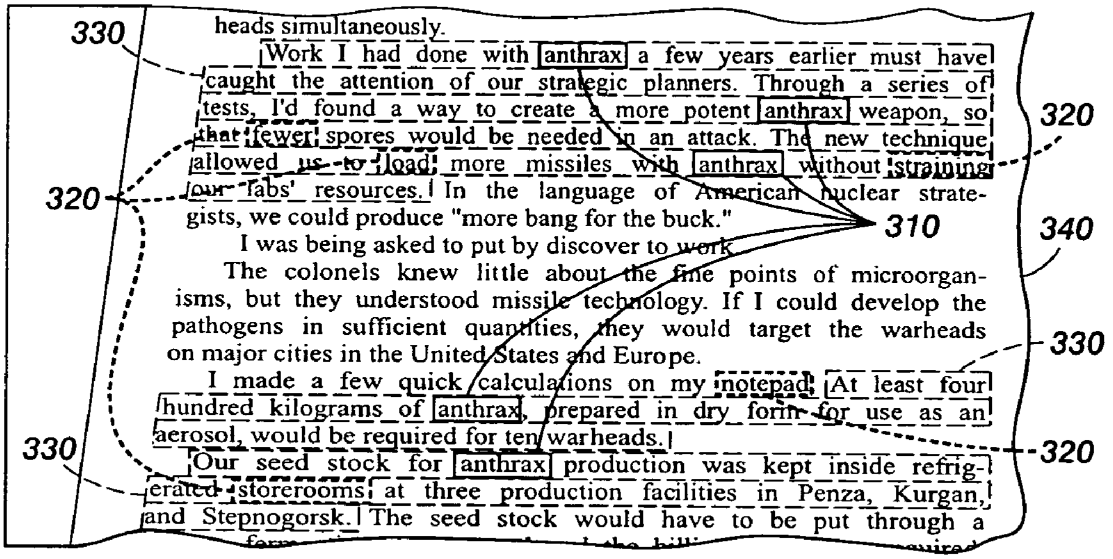

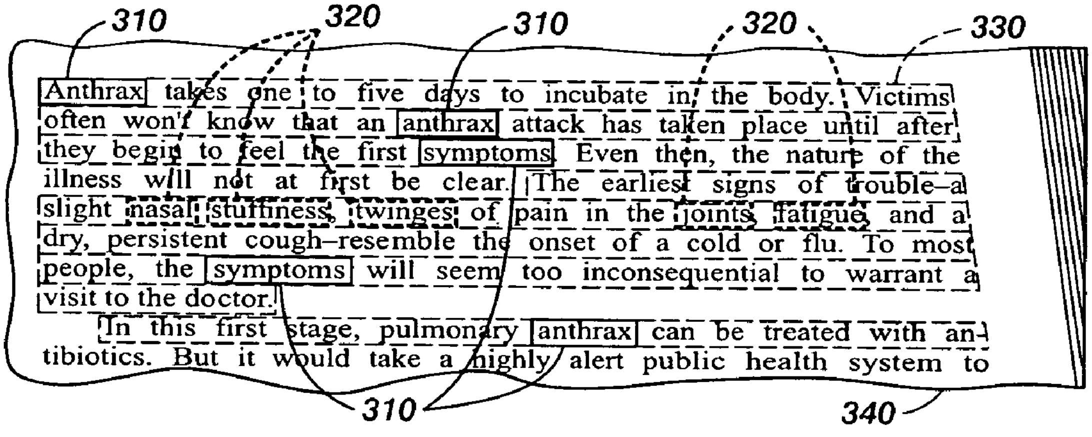

FIG. 3B heads simultaneously.

Work I had done with [anthrax] a few years earlier must have caught the attention of our strategic planners. Through a series of tests, I'd found a way to create a more potent [anthrax] weapon, so that fewer spores would be needed in an attack. The new technique allowed us to load more missiles with [anthrax] without straining our labs' resources. In the language of American nuclear strategists, we could produce "more bang for the buck."

I was being asked to put by discover to work.

The colonels knew little about the fine points of microorganisms, but they understood missile technology. If I could develop the pathogens in sufficient quantities, they would target the warheads on major cities in the United States and Europe.

I made a few quick calculations on my notepad. [At least four hundred kilograms of [anthrax], prepared in dry form for use as an aerosol, would be required for ten warheads.]

Our seed stock for [anthrax] production was kept inside refrigerated storerooms at three production facilities in Penza, Kurgan, and Stepnogorsk. The seed stock would have to be put through a

[Anthrax] takes one to five days to incubate in the body. Victims often won't know that an [anthrax] attack has taken place until after they begin to feel the first [symptoms]. Even then, the nature of the illness will not at first be clear. The earliest signs of trouble—a slight nasal stuffiness, twinges of pain in the joints, fatigue, and a dry, persistent cough—resemble the onset of a cold or flu. To most people, the [symptoms] will seem too inconsequential to warrant a visit to the doctor.

In this first stage, pulmonary [anthrax] can be treated with antibiotics. But it would take a highly alert public health system to

METHOD FOR AUTOMATICALLY PERFORMING CONCEPTUAL HIGHLIGHTING IN ELECTRONIC TEXT

Statement Regarding Federally Sponsored Research And Development: This invention was made with Government support under MDA904-03-C-0404 awarded by ARDA. The United States Government has certain rights in this invention.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

FIELD OF THE INVENTION

The invention is in the fields of language processing, text analysis and search summarization and is related to systems and methods for highlighting text, and particularly to a system and method for automatically performing conceptual highlighting in electronic text.

BACKGROUND

Reading is a unique and essential human activity that furthers our collective knowledge and history. Reading is impacted by the complexity of the information environment in which it occurs. The over-abundance of information affects the material selected for reading, as well as the depth in which it is studied.

One of the major advantages of electronic text is that it is much easier to search for keywords within electronic text than ordinary text on paper. Arguably, the onset of web search engines that enable massive search over a large amount of electronic text is the most revolutionary information access development since the invention of the paper book.

The amount of available time and resources to understand written text is shrinking in people's ever-busying lives. These changes in their environment have directly affected the way people interact with written text. Increasingly, reading is occurring online in web logs ("blogs") and on the Internet, and less so on paper. Moreover, readers tend to skim quickly for relevant information nuggets instead of analyzing a piece of text for deep meaning.

Readers are increasingly skimming instead of reading in depth. Skimming also occurs in re-reading activities, where the goal is to recall specific facts surrounding a topic. Bookmarks and highlighters were invented precisely to help achieve this goal. These fundamental shifts in reading patterns have motivated researchers to examine possibilities for enhancing modern-day reading activities. For all these skimming activities, readers need effective ways to direct their attention toward the most relevant passages within text.

Unfortunately, there are current deficiencies in reading/browsing interfaces. For example, current search technology typically allows only exact keyword matches. Once the search is performed, a list of search results is displayed to the users, and they are then allowed to select from this list. Since only exact keyword matches are given, users searching for the keyword "tennis" will only find articles that explicitly mention "tennis." Articles that are highly relevant to tennis but do not contain many mentions of "tennis" will be ranked low or may be missed completely.

There is a large body of work in text processing and information retrieval, much of it based upon latent semantic analysis (LSA) and similar techniques, including search-related summarization. Key sentences can be identified in a document to use as a summary of that document.

One related technique is conceptual search, also known as associative search, i.e., finding documents that refer to concepts described by a given set of terms. Typically, conceptual searches are performed by first applying keyword expansion techniques from information retrieval systems to find related conceptual keywords, and then using these conceptual keywords to perform a search. Related conceptual keywords will also be included in the results of this search process.

The results lists generated by search engines do not highlight relevant passages, but they do highlight exact keyword matches. It is desirable to develop a method and system to direct user attention to sentences or portions of the document that are most relevant to the concepts described by the user's keywords, whether or not these sections explicitly include the user-specified keywords.

In traditional text search systems such as Google, search terms occurring in the retrieved documents are highlighted to give the user feedback. However, conceptually similar keywords are not highlighted, which could be computed by techniques such as LSA. LSA is the basis of a variety of document analysis and search techniques. One aspect of using LSA for text-based searches is that it can locate a document that may be highly relevant to the specified search terms and yet may not actually contain those terms. In other words, LSA can be used to model semantic similarity between documents and passages. It is desirable to develop a system capable of highlighting the most relevant search results regardless of whether and with what frequency the search terms themselves are contained in the results.

Another potential model for modeling semantic similarity between words and documents is the cognitive model called spreading activation, which models human memory retrieval. Spreading activation has been studied extensively for the purpose of both information retrieval and modeling human semantic memory. Spreading activation has also been shown to intelligently model user behavior in browsing a web site. Spreading activation has been shown in cognitive psychology research to simulate how humans retrieve memory chunks in the brain. Spreading activation can be used to simulate and predict the degree of similarity between two pieces of memory chunks.

Word co-occurrence models the relatedness of concepts and the semantic network of a body of text. Word co-occurrence has been used in statistical language processing, and is constructed by understanding how often conceptual keywords occur near each other in the text.

SUMMARY

The invention consists of a method for enhancing the productivity of reading or skimming of text by identifying and conceptually highlighting relevant passages in electronic text. Text encompasses any medium, written, electronic, or otherwise, utilizing sequential characters. Typical forms of text include books, articles, Internet pages, etc. According to embodiments of the invention, a set of conceptual keywords is selected as the words with the highest levels of semantic similarity to the user's interests. The invention creates a list of sentences and other information containing one or more of these conceptual keywords. The invention automatically highlights sentences and other information containing these conceptual keywords. Other information that could also be highlighted encompasses any information in the text not comprised in sentence form. Possible examples of other information are graphs and tables.

According to embodiments of the invention, user interests are explicitly determined by user activity. Activity comprises user-generated keywords that the user explicitly generates in real-time activity such as a search box, and also comprises interests that are implicitly constructed from the text and index entries browsed and read by the user. User activity comprises one or more of text that the user browses or reads; index entries that the user browses or reads; and keywords that the user specifies.

According to one set of embodiments of the invention, conceptual keywords with the highest levels of semantic similarity to the user interests are selected using latent semantic analysis (LSA). According to another set of embodiments, conceptual keywords are selected by combining spreading activation and word co-occurrence. The joint use according to embodiments of the invention of spreading activation and word co-occurrence semantically models and encapsulates related concepts in one or more documents. The resulting model can then be applied to a new text so as to determine the portions of the new document that merit the closest attention according to the user's own criteria. Embodiments of the invention automatically locate sentences and other information that are most conceptually relevant to user interests based on the presence of conceptual keywords. These sentences and other information are then automatically highlighted. In certain embodiments, the text can be pre-highlighted before it is even opened by the user.

Automatic highlighting according to embodiments of the invention enables a new kind of interactive browsing of electronic text in which a user's attention is guided toward the most relevant sentences and other information according to keywords based on user interests. Conceptual highlights can be activated in three different ways, more than one of which may occur simultaneously: (1) when the user directly performs a keyword search; (2) when the user performs an index search; and (3) the invention can generate an interest profile or other information reflecting user interests, apply it to the text, and generate and display highlights. When performing an index search, a conceptual index can be generated that displays entries conceptually related to user-specified keyword (s) by again using a combination of spreading activation and word co-occurrence. Once a user selects an index entry, a search is performed according to the conceptual search process described above. The selected page of the book is displayed, and passages relevant to that index entry are highlighted in the book whether or not the keywords are themselves contained in the highlighted passages.

According to embodiments of the invention, interactive dynamic summaries of text are created according to interest profiles or other information reflecting the user's interests, as directly selected by the user or as created based on user behavior.

The invention was implemented in the context of an electronic book reading system. The invention can be applied to a reading system in general or to other electronic text including Internet search results.

The dynamic summarization and highlighting functions of the invention are designed to work with a broad range of conceptual search algorithms. According to one set of embodiments, given a keyword vector K, a conceptual keyword vector K' is computed that includes the original keywords as well as a set of conceptually related keywords. K' is computed through an iterative spreading activation process using a word co-occurrence matrix WC.

According to an embodiment of the invention, for each search performed by the user, and for each index entry selected, keywords from the search are added to the interest profile or other information reflecting user interests. Each time a new search is entered, and each time an index entry is selected, the term weights of the existing terms in the interest profile are decreased dramatically. As the user browses through multiple index entries, keyword sets are accumulated from the index entries according to an embodiment of the invention. Each index entry browsed is added to the interest profile directly.

BRIEF DESCRIPTION OF THE DRAWINGS

Embodiment(s) of the present invention will be described in detail based on the following figures, wherein:

FIG. 2 is a screen shot that depicts a highlighted view of two pages of the text;

FIG. 3 contains two screen shots that illustrate detail views of portions of the two pages, showing relevant passages that were highlighted by the invention;

DETAILED DESCRIPTION

Figure 1:
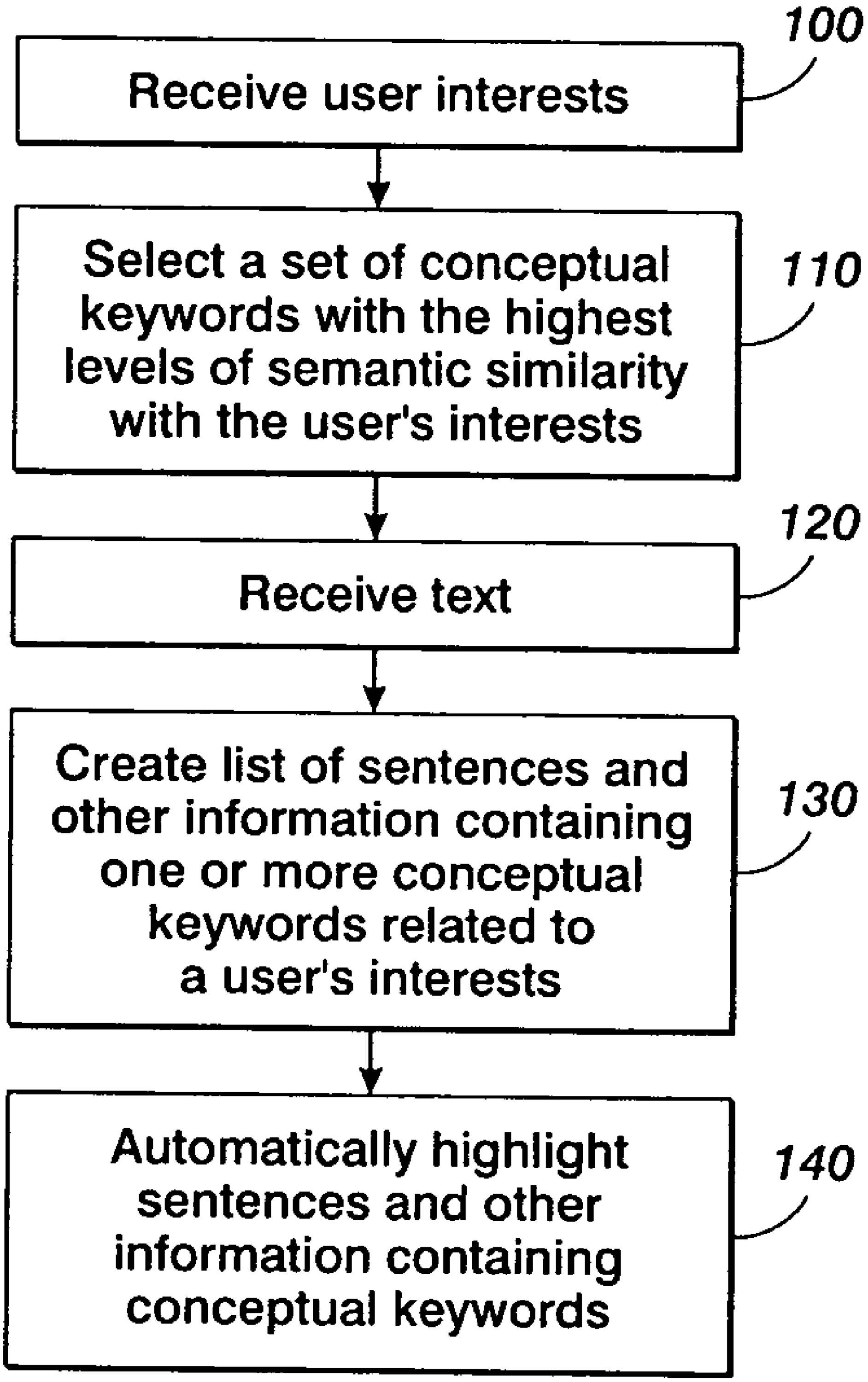
FIG. 1 is a flow chart illustrating the process of automatic highlighting according to embodiments of the invention.

The invention consists of a method for enhancing the productivity of reading or skimming of text by identifying and conceptually highlighting relevant passages in electronic text. Text encompasses any medium, written, electronic, or otherwise, utilizing sequential characters. Typical forms of text include books, articles, Internet pages, etc. According to embodiments of the invention, a set of conceptual keywords is selected as the words with the highest levels of semantic similarity to the user's interests. The invention creates a list of sentences and other information containing one or more of these conceptual keywords. The invention automatically highlights sentences and other information containing these conceptual keywords. Other information encompasses any information in the text not comprised in sentence form. Possible examples of other information are graphs and tables.

According to embodiments of the invention, user interests are explicitly determined by user activity. Activity comprises user-generated keywords that the user explicitly generates in real-time activity, and also comprises interests that are implicitly constructed from the text and index entries browsed and read by the user. User activity comprises one or more of text that the user browses or reads; index entries that the user browses or reads; and keywords that the user specifies.

According to one set of embodiments of the invention, conceptual keywords with the highest levels of semantic similarity to the user interests are selected using latent semantic analysis (LSA). According to another set of embodiments, conceptual keywords are selected by combining spreading activation and word co-occurrence. The joint use according to embodiments of the invention of spreading activation and word co-occurrence semantically models and encapsulates related concepts in one or more documents. The resulting model can then be applied to a new text so as to determine the portions of the new document that merit the closest attention according to the user's own criteria. Embodiments of the invention automatically locate sentences and other information that are most conceptually relevant to user interests based on the presence of conceptual keywords. These sentences and other information are then automatically highlighted. In certain embodiments, the text can be pre-highlighted before it is even opened by the user.

Automatic highlighting according to embodiments of the invention enables a new kind of interactive browsing of electronic text in which a user's attention is guided toward the most relevant sentences and other information according to keywords based on user interests. Conceptual highlights can be activated in three different ways, more than one of which may occur simultaneously: (1) when the user directly performs a keyword search; (2) when the user performs an index search; and (3) the invention can generate an interest profile or other information reflecting user interests, apply it to the text, and generate and display highlights. When performing an index search, a conceptual index can be generated that displays entries conceptually related to user-specified keyword (s) by again using a combination of spreading activation and word co-occurrence. Once a user selects an index entry, a search is performed according to the conceptual search process described above. The selected page of the book is displayed, and passages relevant to that index entry are highlighted in the book whether or not the keywords are themselves contained in the highlighted passages.

According to embodiments of the invention, interactive dynamic summaries of text are created according to interest profiles or other information reflecting the user's interests, as directly selected by the user or as created based on user behavior.

General Method of Automatic Highlighting According to Invention

Figure 4:
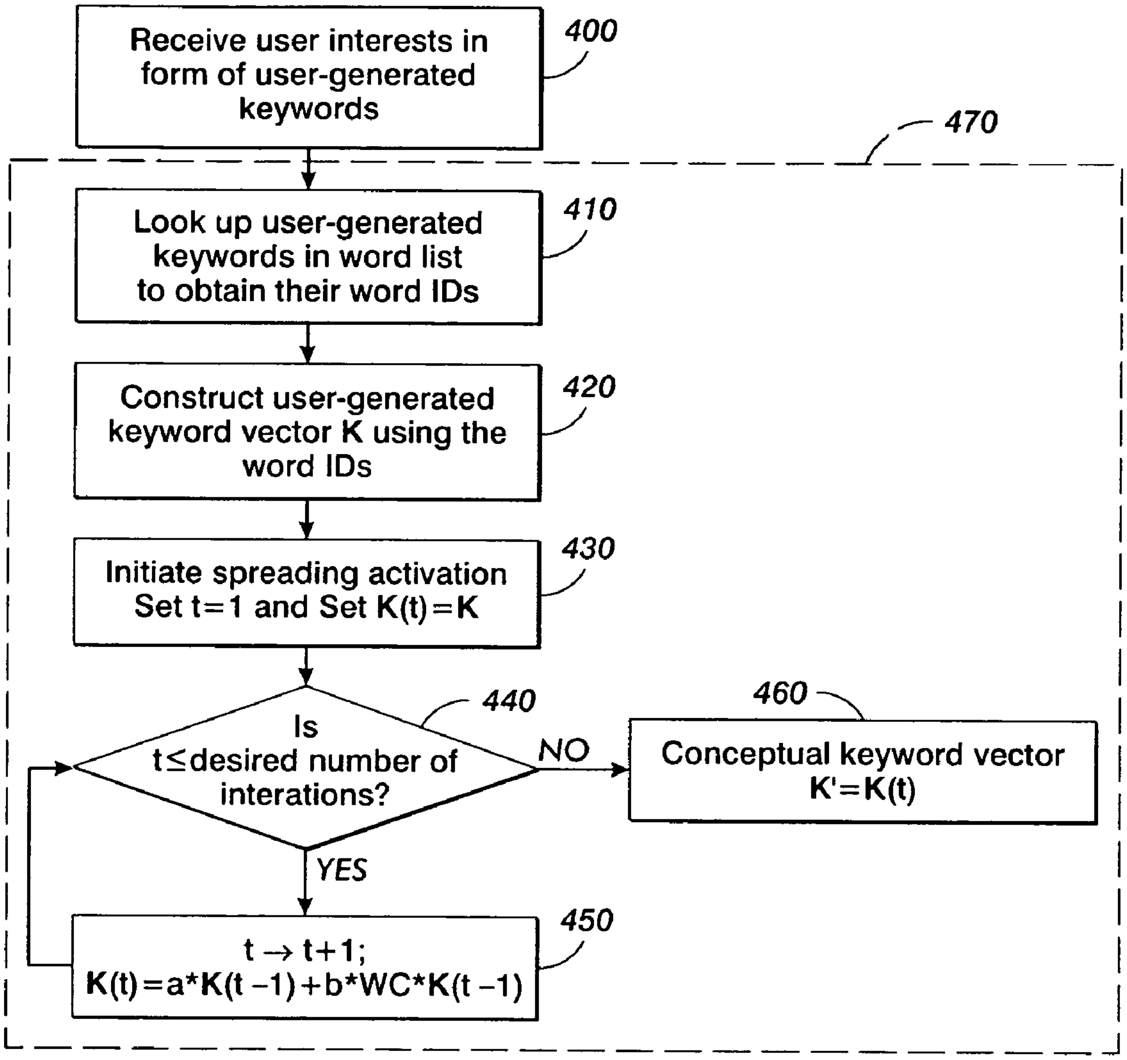
FIG. 4 is a flow chart illustrating one set of embodiments of the invention, according to which, given a user-generated keyword vector K, spreading activation is used to create a conceptual keyword vector K'.

A flow chart illustrating the process of automatic highlighting according to embodiments of the invention is shown in FIG. 1. Given a user's interests, a set of conceptual keywords is selected with the highest levels of semantic similarity with user interests. The set of conceptual keywords includes keywords directly representing the user's interests as well as a set of conceptually related keywords found through a conceptual search based on user interests. In step 100, user interests are received. In step 110, a set of conceptual keywords is selected with the highest levels of semantic similarity with user interests. This may be done according to a wide variety of methods. One possible method is LSA. Another possible method is spreading activation combined with word co-occurrence as disclosed in more detail in FIG. 4 below and the associated text. The steps contained inside dotted line 470 in FIG. 4 are a special case of step 110.

Figure 5:
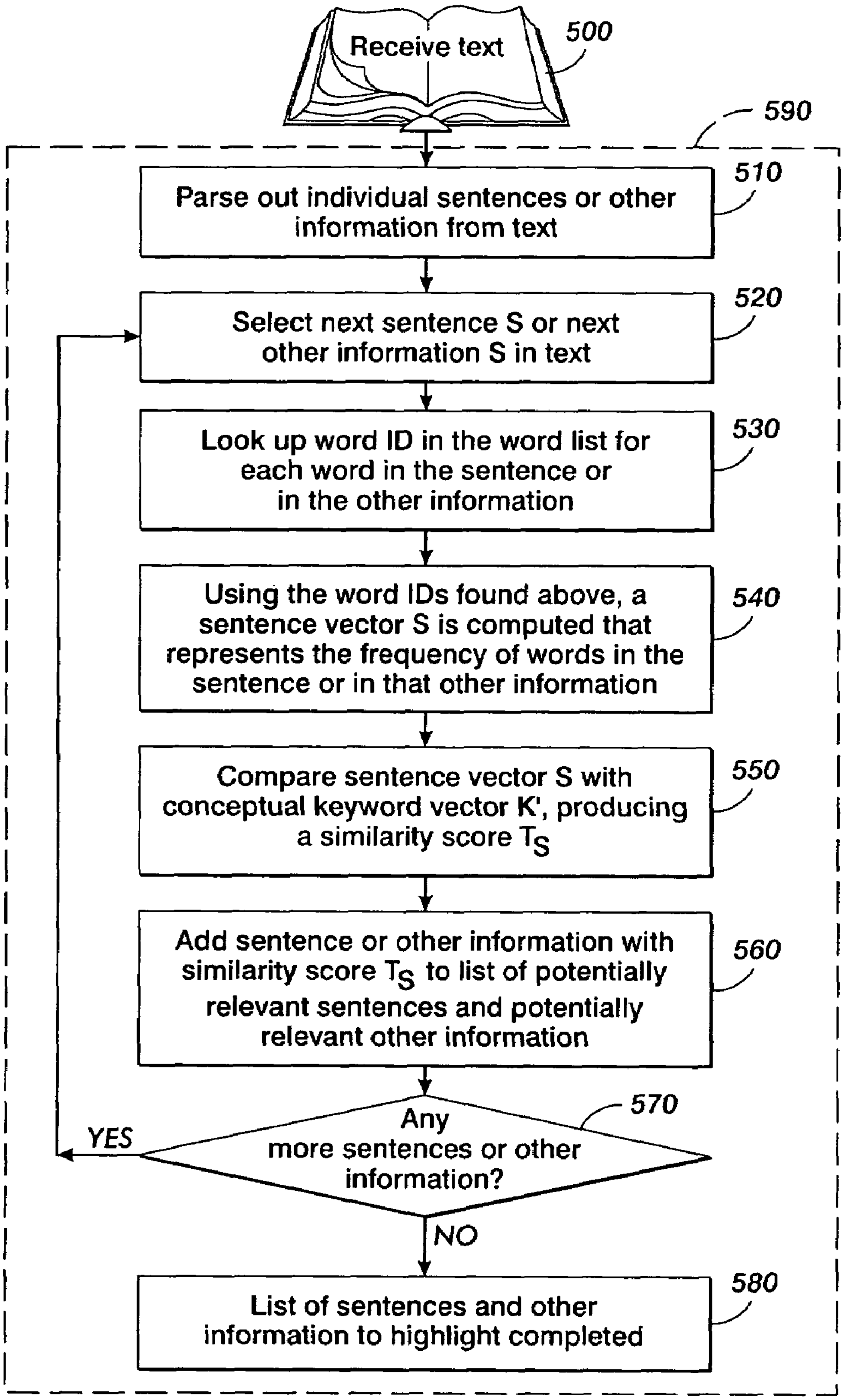
FIG. 5 is a flow chart illustrating one set of embodiments of the invention, according to which a conceptual highlighting algorithm provides a method for highlighting sentences and other information containing conceptually related material.

Next, based on the user's interests, a list of sentences and other information is created containing one or more conceptual keywords. In step 120, the text is received. In step 130, a list of sentences and other information is created containing one or more conceptual keywords. This may be done according to a wide variety of methods. One possible method is the algorithm disclosed in more detail according to one set of embodiments of the invention depicted in the flow chart shown in FIG. 5 below and the associated text. The steps contained inside dotted line 590 in FIG. 5 are a special case of step 130. In step 140, sentences and other information containing conceptual keywords are automatically highlighted.

Embodiments of the invention were implemented in an electronic book reading system. Embodiments of the invention can be applied to a reading system in general or to other electronic text including, as one example, Internet search results. The book used as an example here is *Biohazard* by Ken Alibek, which is a non-fiction retelling of the author's experiences working on biological weapons in the former Soviet Union.

According to the illustrated embodiment, searching for "anthrax symptoms" produces the sentence and keyword highlights shown, as an example, in FIG. 2. FIG. 2 is a screen shot that depicts a highlighted view 200 of two pages (as an example, pages 6 and 7) of the text. According to embodiments of the invention, different colors are used for highlighting different kinds of information relating to user interests. As one example, user-specified keywords 210 may be displayed in one or more colors (as one example, green and blue), conceptual keywords 220 other than user-specified keywords 210 may be displayed in a second color (as one example, gray) while words 230 other than user-specified keywords 210 and other than conceptual keywords 220 that are comprised in highlighted sentences and other highlighted information may be displayed in a third color (as one example, yellow). The types of information highlighted are open to user modification. Additionally, all color selections are arbitrary and open to user modification.

According to the same example, FIG. 3 contains two screen shots that illustrate detail views of portions of the two pages, showing the relevant passages that were highlighted by the invention. FIG. 3A is a screen shot that depicts a highlighted detail view of a portion 340 of page 6 of the book, and FIG. 3B is a screen shot that depicts a highlighted detail view of a portion 340 of page 7. Again, according to embodiments of the invention, different colors are used for highlighting different kinds of information relating to user interests. Again, as one example, user-specified keywords 310 are displayed in one color, conceptual keywords 320 other than user-specified keywords 310 are displayed in a second color while words 330 other than user-specified keywords 310 and other than conceptual keywords 320 that are comprised in highlighted sentences and other highlighted information are displayed in a third color.

In FIG. 3A, the highlighted text from page 6 shows that Ken Alibek had worked on creating an anthrax weapon. In FIG. 3B, the highlighted text from page 7 provides some information the user is seeking. The highlighted text describes anthrax symptoms including incubation period in the body, victim awareness that an anthrax attack has occurred, earliest signs of trouble, and treatment for anthrax while in its first stage.

It should be noted that one advantage of a conceptual search is that information may thereby be located that is relevant to user needs even when it is not strictly described by the literal search terms. In this example, victim awareness of an attack and treatment in the first stages of the disease are not, strictly speaking, symptoms of anthrax, yet may be highly relevant to user needs. Searching forward or turning to each new page will continue to produce highlights of sentences and other information containing conceptual keywords that are conceptually relevant to the search keywords entered.

As the information most directly relevant to the query, the user learns that anthrax symptoms include nasal stuffiness, twinges of pain in joints, fatigue, and a dry persistent cough. The spreading activation process thus produces highlights that are extremely relevant to the task at hand.

Method Using Invention Algorithm for Selecting Conceptual Keywords using Spreading Activation The highlighting functions of the invention, as well as the dynamic summarization functions, are designed to work with a broad range of conceptual search algorithms. The invention makes use of semantic and association networks to perform conceptual searches. The conceptual search algorithm disclosed herein provides one method for selecting conceptually relevant keywords. Many other conceptual search algorithms are possible and are usable with the invention's interactive dynamic summarization and conceptual highlighting functions. Examples of commercially available approaches include those developed by Autonomy and by Google.

According to one set of embodiments illustrated in the flow chart shown in FIG. 4, given a user's interests as expressed through a user-generated keyword vector K, spreading activation is used to create a conceptual keyword vector K'. K' includes keywords directly representing the user's interests as well as a set of conceptually related keywords found through a conceptual search based on user interests. According to one set of embodiments, K' is computed through an iterative spreading activation process using a word co-occurrence matrix WC. WC is constructed by going through the entire document corpus and computing, using a running window for every keyword, how often a keyword co-occurs with another keyword. A running window of 40 words was found to work well in practice.

In step 400 of FIG. 4, user interests are received in the form of a set of user-generated keywords. In step 410, the user-generated keywords are looked up in a word list to obtain their word identification codes ("word ID codes"). In step 420, a user-generated keyword vector K is created using the word ID codes. In step 430, spreading activation is initiated. Iteration counter t is set to 1 and K(1)=K. In step 440, it is determined whether t is less than or equal to the desired number of iterations. If the answer is yes, then in step 450, iteration counter t is reset to t+1. K(t) is computed according to the following equation, in which word co-occurrence matrix WC is used as a spreading activation matrix pursuant to the spreading activation process:

$$K(t)=K'=a*K+b*WC*K(t-1),$$

where a and b are constant factors, and a+b=1.

The process then loops back to step 440. After t iterations, K(t)=K' is obtained, which is now a conceptual keyword vector that includes words that co-occur with keywords comprised in K, the original keyword vector. Accordingly, when the answer in step 440 is no, meaning that the desired number of iterations have been completed, then in step 460, the conceptual keyword vector K'=K(t). The process is then complete. The steps contained inside dotted line 470 are a special case of step 110 in FIG. 1.

In practice, words occurring frequently in the text's language have a high probability of showing up in K(t). According to one set of embodiments, to normalize the keywords according to their relative frequencies in the language, a term frequency is computed for every word in the corpus, generating a vector TF that specifies the term frequency of each keyword in the language used in the text. The weights of K(t) are then modified according to the following equation to obtain $K_{norm}'$:

$$K_{norm}'=K'/(c*TF), \text{ where c is a constant.}$$

The vector $K_{norm}'$ specifies the conceptual keywords that are relevant to the original specified search terms. $K_{norm}'$ also specifies the relative weights (or importance) of the conceptual keywords. $K_{norm}'$ can be viewed as the basis for a Degree-of-Interest (DOI) function.

Method Using Invention Algorithm for Creating List of Sentences and Other Information Containing Conceptual Keywords Given an electronic document D, embodiments of the invention highlight sentences and other information that contain terms that are conceptually related to the user-specified search terms. According to one set of embodiments illustrated in the flow chart shown in FIG. 5, the conceptual highlighting algorithm disclosed herein provides one method for highlighting sentences and other information containing conceptually related material. Many other conceptual highlighting algorithms are possible and are usable with the invention's interactive dynamic summarization and conceptual search functions.

In step 500, a text of interest is received. In step 510, individual sentences or other information from the text is parsed out. In step 520, the next sentence S or next other information S is selected. In step 530, for each word in the sentence or other information, the word ID is looked up in the word list. In step 540, using the word ID's found in step 530, a sentence vector S is computed that represents the frequency of words in that sentence or in that other information. In step 550, the sentence vector S is compared with conceptual keyword vector K'. This comparison may be carried out in various ways. For example, a dot product of S and K' may be computed. As one specific form of dot product, a cosine similarity function may be computed for S and K'. Other comparison methods are also possible. This produces a similarity score $T_S$ for each sentence S. In step 560, the sentence or other information with its associated similarity score $T_S$ is added to a list of potentially relevant sentences and potentially relevant other information. In step 570, it is queried whether there are any more sentences or any more other information? If the answer is yes, then the process loops back to step 520. If the answer is no, then the process continues to step 580, in which the list of sentences and other information to highlight is completed. The steps contained inside dotted line 590 are a special case of step 130 in FIG. 1. Using the list, according to a process described in more detail below, the top-ranked sentences and/or other information can be highlighted according to embodiments of the invention.

The intelligence of the method is embedded behind the interface, which does not expose the semantic network to the users. Users cannot directly modify or change the semantic network. By hiding these details, and by only augmenting existing search and reading processes, users are not entirely confused by the operation of the interface.

General Method for Combining Highlights with a Conceptual Index

Figure 6:
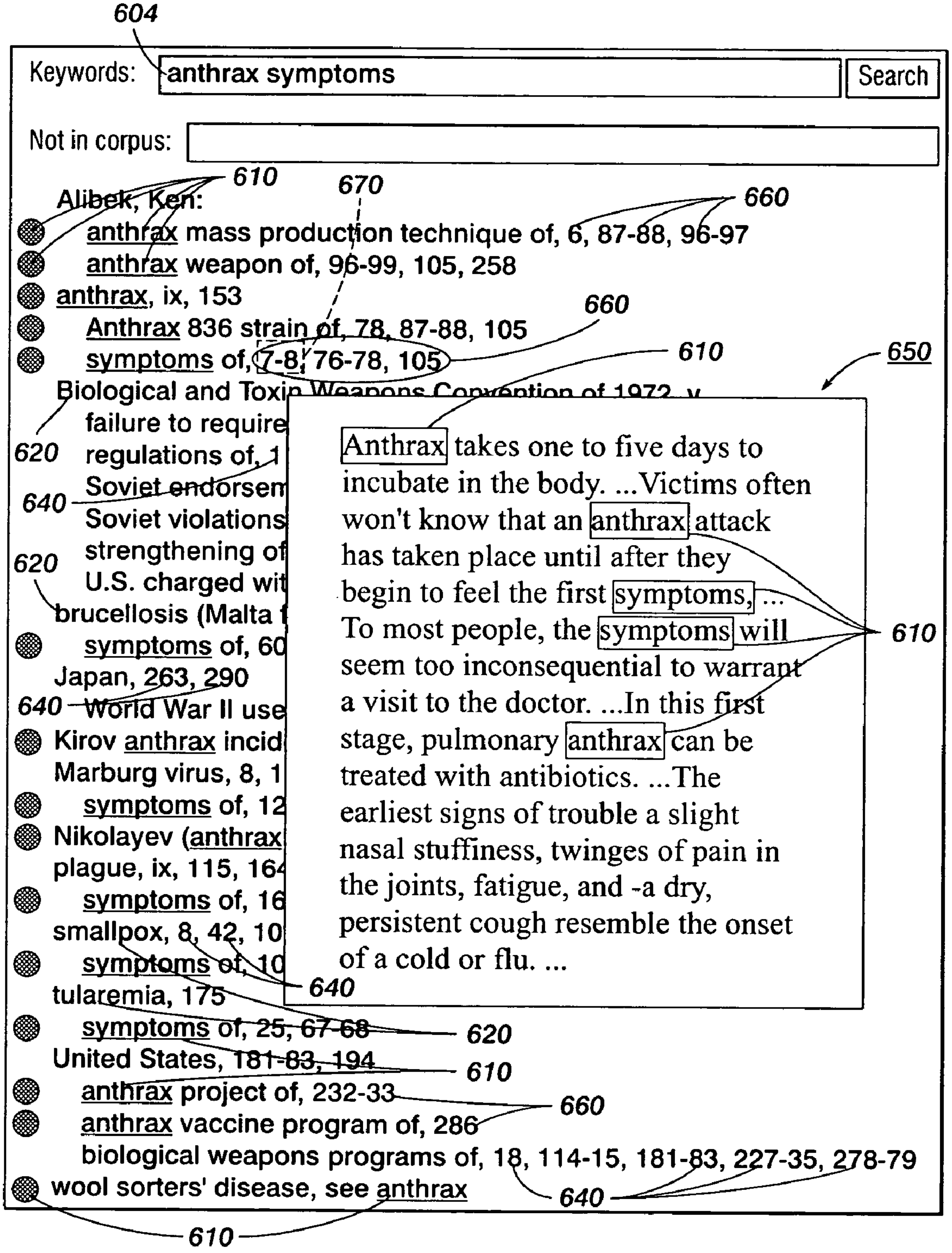
FIG. 6 is a screen shot created according to embodiments of the invention, depicting a portion of a conceptual index created after entry of a keyword term.

In addition to the method described above for constructing a conceptual index according to the invention, highlights can be further combined with a conceptual index according to embodiments of the invention. The user can type a set of keywords K to be used to create a custom user index. The system then computes a conceptual index based on the keyword vector K, and displays it. In the screen shot illustrated in FIG. 6, as an example, a portion of a conceptual index 600 is depicted. Conceptual index 600 is created according to embodiments of the invention after the keyword search term 604 "anthrax symptoms" has been entered. The conceptual index offers the user an intuitive, user-friendly interface enabling the user to quickly browse through a conceptual index, reviewing entries both literally and conceptually associated with user-generated keywords. The user can effortlessly gain a sense of the relevant text. The user also can thereby quickly locate the most potentially relevant sentences and the most potentially relevant other information.

User-specified index terms 610 are retrieved. After the user selects an index entry, index entry keywords are added to the list of search keywords, and all of the conceptually related passages and keywords and other information are highlighted. Conceptual index terms 620 containing related concepts such as brucellosis, smallpox, and tularemia are also retrieved even though they are not specified as part of the keyword set. Each index entry 640 created as part of conceptual index 600 corresponds to a page number or to a set of page numbers in the index.

Using a mouse or similar device, according to embodiments of the invention, the user can select any of the index entries 640 to obtain a tool tip 650 of the relevant passages in that text. While the user is browsing over the index entries 640, a tool tip 650 is displayed corresponding with each browsed index entry 640. For each corresponding index entry 640, tool tip 650 encompasses the top-ranked conceptually highlighted sentences and other information that the user would see if the user were to click on the given index entry 640. Tool tip 650 contains the top relevant sentences and other information from the selected page. As mentioned above, a wide variety of highlighting options are available. In the illustrated example, user-specified keywords 610 are displayed in one or more colors.

Also, according to one set of embodiments, the tool tip in the index search interface brings more information scent toward the user, enabling the user to obtain a preliminary understand of the content before the user selects a page. This feature is roughly analogous to the summary sentences offered by search engines and is intuitively understandable to a typical user.

In this example, the invention located three directly relevant index entries 660 that are directly relevant to the keyword search term 604, "anthrax symptoms." These directly relevant index entries 660 are located at pages 7-8, 76-78, and 105. The user can browse over the tool tip 650 for each index entry 640 to determine the text that is likely to contain the most relevant information. Selecting the directly relevant index entry 660 corresponding to pages 7-8 as the currently selected index entry 670 brings the user directly to the selected pages. As shown by tool tip 650, these pages contain information regarding keyword term 610 anthrax symptoms. As shown in FIGS. 2 and 3, the information regarding keyword search term 604 is already highlighted per user interests.

According to one set of embodiments of the invention, when the user selects the page number of one of the index entries, the keywords in that index entry are added to the list of keywords the user has entered into the system. This creates a new keyword vector $K_{new}$. In the above example, selecting "Ebola virus" on page 8 creates a keyword set of "Marburg Ebola virus", combining the original keyword set "Marburg" and the index entry keyword set "Ebola virus". The same process occurs upon other user activity, such as browsing or reading a page, or specifying new keywords for a search.

According to one set of embodiments of the invention, the new keyword vector $K_{new}$ is then used to select conceptually similar keywords $K_{new}'$ using the above spreading activation process. Finally, $K_{new}'$ is used to choose a set of sentences and other information on the page to highlight as described above.

Conceptual highlights can be according to the invention with both a conceptual index and with an interest profile or other information reflecting user interests generated from user's activity. Combination of highlights with a conceptual index, as described immediately above, and combination of highlights with an interest profile, as described below, manifest as special cases of embodiments of the invention that allows for both possibilities to occur simultaneously.

General Method for Combining Highlights with an Interest Profile or Other Information Reflecting User Interests Generated from User's Activity If not specified by a user, an interest profile or other information reflecting user interests is generated from the user's reading and browsing activity according to embodiments of the invention. According to embodiments of the invention, passages relevant to topics in which a user is likely to be interested are identified and highlighted. User-specified keywords are added to the keyword vector.

According to an embodiment of the invention, each time the user's interests are updated, user-specified keywords are added into the keyword vector. The relative weights of the existing keywords in the existing interest profile are decreased. A simple linear weighting method is used to place more importance on the recent keywords encountered by the user. The interest profile is generated from time spent reading each page's content. For a page that the user is reading or browsing, the representative keyword vector of the page is calculated. Then a normalized product of the keyword vector and the time spent browsing and reading the page is incorporated into the user's interests. Similarly, for an index entry that the user is reading or browsing, the representative keyword vector of the index entry is calculated. Then a normalized product of the keyword vector and the time spent browsing and reading the index entry is incorporated into the interest profile.

According to an embodiment of the invention, for each search performed by the user, and for each index entry selected, representative keywords from the search are added to the interest profile. Once a new search is begun, or a new index entry is selected, any user interest in previous searches is likely to be minimal and/or ephemeral. Therefore, according to an embodiment of the invention, each time a new search is entered, and each time an index entry is selected, the term weights of the existing terms in the interest profile are decreased dramatically.

As the user browses through multiple index entries, keyword sets are accumulated from the index entries according to an embodiment of the invention. Each index entry browsed is added to the interest profile directly. Once a new index entry is selected, any user interest in previous index entries is likely to be minimal and/or ephemeral.

General Method for Determining Sentences to be Highlighted in Compliance with User-Specified Highlighting Preference According to a set of embodiments of the invention, the user can specify a highlighting preference regarding the degree and nature of highlighting to be performed. Highlights are then created in accordance with the specified highlighting preference.

Figure 7:
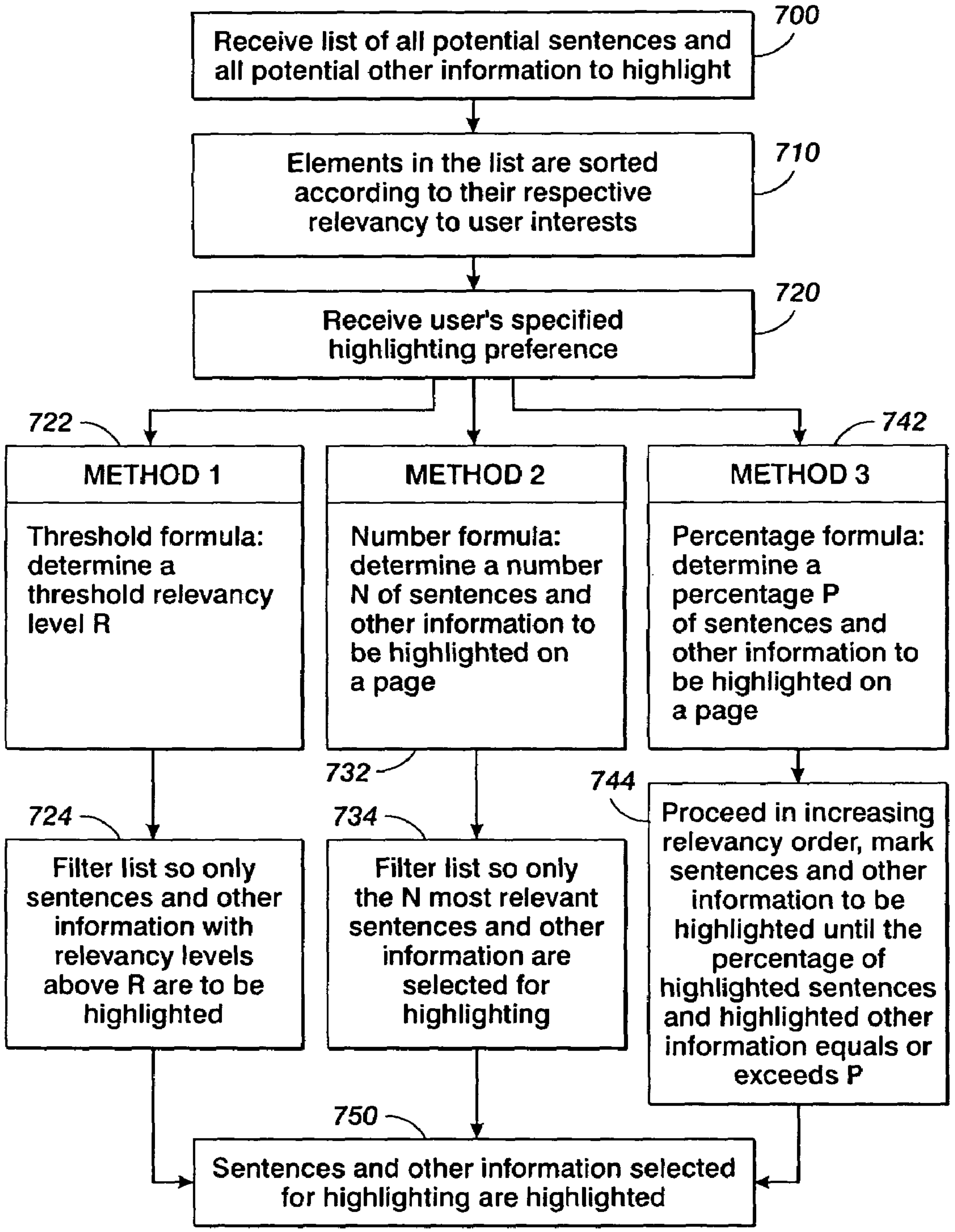
FIG. 7 is a flow chart illustrating, according to a set of embodiments of the invention, the creation of highlights in accordance with a user-specified highlighting preference regarding the degree and nature of highlighting to be performed.

FIG. 7 shows a flow chart that depicts this set of embodiments. In step 700, the list created in step 130 of FIG. 1 is received. This list comprises sentences and other information containing one or more conceptual keywords related to a user's interests. This list is, according to embodiments of the invention, a list of all potential sentences to highlight. Such a list could, for example, comprise the entire text, or selected pages of the text. As another example, such a list may be obtained as depicted in FIG. 5, using the invention algorithm for creating a list of sentences and other information containing conceptual keywords.

In step 710, elements in the list are sorted according to their respective relevancy to user interests. In the special case depicted in FIG. 5, this relevancy is formulated in the similarity scores $T_S$. In this case, potential sentences and potential other information are simply sorted according to their similarity scores $T_S$.

According to the current set of embodiments, highlighting is performed only on sentences and other information complying with the user-specified highlighting preference.

In step 720, the user's specified highlighting preference is received. In step 722, according to one set of embodiments of the invention, the highlighting preference is a threshold relevancy level R. According to this set of embodiments, all sentences and other information earning a relevancy level R above the threshold are to be highlighted and all other sentences and other information are not highlighted. In step 724, the list is filtered so only sentences and other information with relevancy levels above R are to be highlighted.

In step 732, the highlighting preference specified by the user is a number formula capable of determining the number N of sentences and other information to be highlighted on a page (or other specified information unit). According to one embodiment of the invention, N is a constant. In step 734, the list is filtered so that only the N most relevant sentences and other information are selected for highlighting. In the example illustrated in FIGS. 1 and 2, this last highlighting preference is selected, with the formula N=5. Accordingly, the top five sentences that are the most related to the original search are highlighted on each of the pages.

In step 742, according to yet another set of embodiments of the invention, the highlighting preference specified by the user is a percentage formula capable of determining the percentage P of sentences and other information to be highlighted on a page (or other specified information unit). According to one embodiment of the invention, P is a constant. In step 744, proceeding in increasing relevancy order, sentences and other information to be highlighted are marked until the percentage of highlighted sentences and other information equals or exceeds P.

In step 750, the sentences and other information selected for highlighting are highlighted.

System Implementation:

A prototype of the invention has been built and tested in an electronic book system. The method can be applied to a reading system in general or to other text including web search results. A conceptual search is performed, and the results are viewable as automatically highlighted text.

Figure 8:
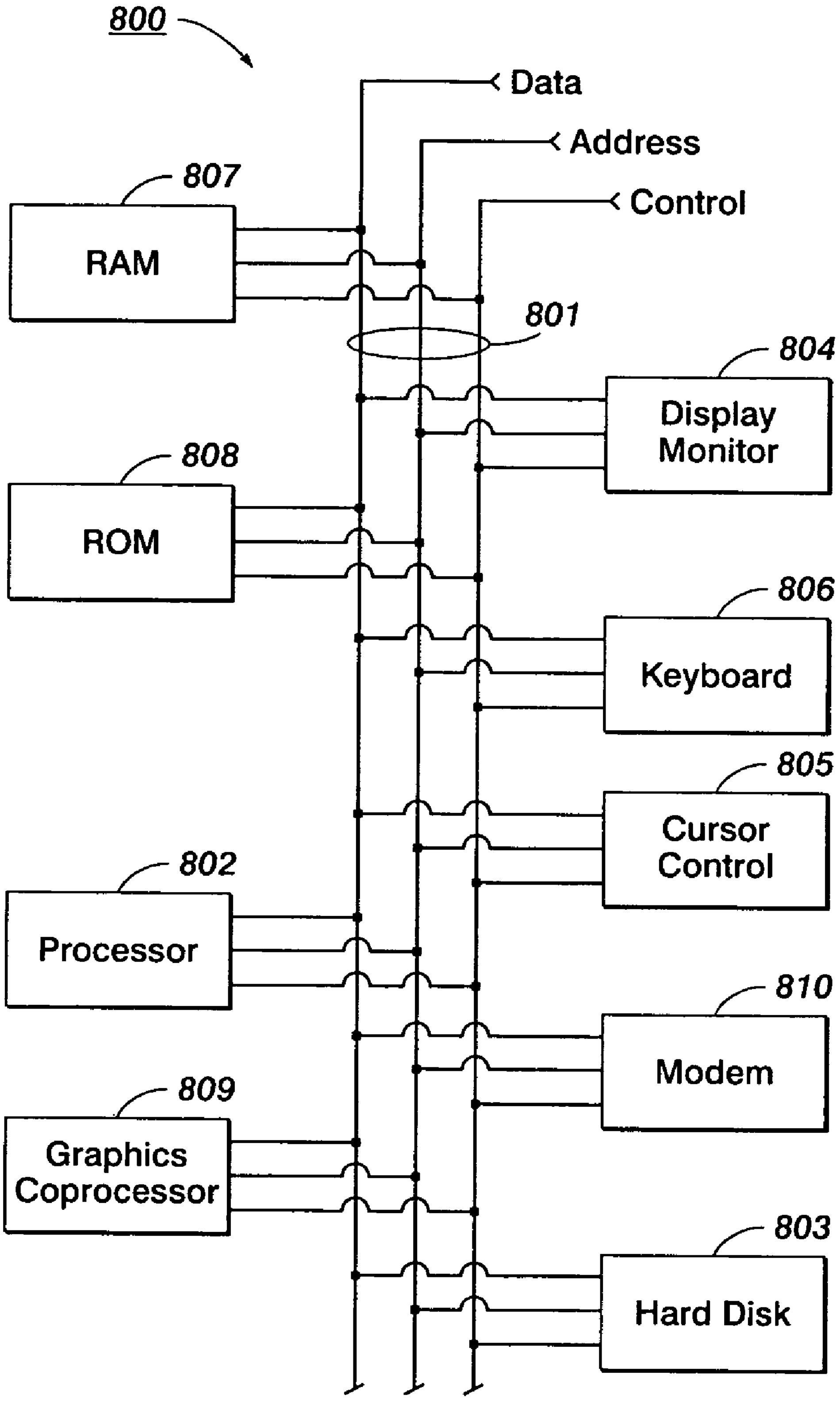
FIG. 8 is a block diagram that illustrates a general purpose computer architecture suitable for performing the methods of the present invention.

FIG. 8 is a block diagram that illustrates a general purpose computer system 800 suitable for implementing the methods according to the present invention. The general purpose computer system 800 includes one or more processors 802. The cursor control device 805 is implemented as a mouse, a joy stick, a series of buttons, or any other input device which allows a user to control position of a cursor or pointer on the display monitor 804. The general purpose computer may also include random access memory 807, external storage 803, ROM memory 808, a keyboard 806, a modem 810 and a graphics co-processor 809. The cursor control device 805 and/or the keyboard 806 are exemplary user interfaces for receiving user input according to the present invention. All of the elements of the general purpose computer 800 are optionally tied together by a common bus 801 for transporting data between the various elements. The bus 801 typically includes data, address, and control signals. Although the general purpose computer 800 illustrated in FIG. 8 includes a single data bus 801 which ties together all of the elements of the general purpose computer 800, there is no requirement that there be a single communication bus 801 which connects the various elements of the general purpose computer 800. For example, the one or more processors 802, RAM 807, ROM 808, and graphics co-processor 809 are alternatively tied together with a data bus while the hard disk 803, modem 810, keyboard 806, display monitor 804, and cursor control device 805 are connected together with a second data bus (not shown). In this case, the first data bus 801 and the second data bus (not shown) are linked by a bi-directional bus interface (not shown). Alternatively, some of the elements, such as the one or more processors 802 and graphics co-processor 809, are connected to both the first data bus 801 and the second data bus (not shown), and communication between the first and second data bus occurs through the one or more processors 802 and graphics co-processor 809. The methods of the present invention are thus executable on any general purpose computer system such as the 800 illustrated in FIG. 8, but there is clearly no limitation that this computer system is the only one which can execute the methods of the present invention.

In a typical implementation, the operator uses a computer system that includes a computer display, and some form of graphical interface executing thereon, for example, a Unix Windows environment, a Mac OS, or a Microsoft Windows environment, or some other graphical application environment. It will be evident to one skilled in the art that embodiments of the invention can be equally used with other forms of graphical user interface (GUI).

Appropriate software coding can readily be prepared by skilled programmers based on the teachings of the present disclosure, as will be apparent to those skilled in the software art. Embodiments of the invention may also be implemented by the preparation of application specific integrated circuits or by interconnecting an appropriate network of conventional component circuits, as will be readily apparent to those skilled in the art.

Embodiments of the present invention include a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Embodiments of the present invention include software, stored on any one of the computer readable medium (media), for controlling both the hardware of the general purpose/specialized computer or microprocessor, and for enabling the computer or microprocessor to interact with a human operator or other mechanism utilizing the results of the present invention. Such software may include, but is not limited to, device drivers, operating systems, and user applications. Ultimately, such computer readable media further includes software for executing the present invention, as described above.

Stored on any one of the computer readable medium (media), embodiments of the present invention include software for controlling both the hardware of the general purpose/specialized computer or processor, and for enabling the computer or processor to interact with a human user or other mechanism utilizing the results of embodiments of the present invention. Such software may include, but is not limited to, device drivers, operating systems, and user applications. Ultimately, such computer readable media further includes software for performing embodiments of the present invention, as described above.

Included in the software of the general/specialized computer or processor are software modules for implementing the teachings of the present invention, including, but not limited to, selecting a set of conceptual keywords related to a user's interests, wherein said conceptual keywords are those words with the highest levels of semantic similarity with said interests; creating a list of sentences and other information containing one or more of said conceptual keywords; and automatically highlighting sentences and other information containing said conceptual keywords.

Embodiments of the present invention may be conveniently implemented using a conventional general purpose or a specialized digital computer or processor programmed according to the teachings of the present disclosure, as will be apparent to those skilled in the computer art.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that the above described features of automatically performing conceptual searches of electronic text; of computing conceptual keywords related to the user's interests by combining spreading activation and word co-occurrence, by latent semantic analysis, or by other means; of creating a list of sentences and other information containing one or more of the conceptual keywords; and of automatically highlighting sentences and other information containing said conceptual keywords, can be incorporated into other types of software applications beyond those described. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A computer-implemented method for automatically performing conceptual highlighting in electronic text, comprising:

selecting a set of conceptual keywords related to a user's interests in an electronic text on a computer with at least one processor, wherein said conceptual keywords are words with the highest levels of semantic similarity with said interests, wherein said interests comprise a user-generated keyword vector K comprising user-generated keywords, wherein said user-generated keywords are generated from a user's activity, wherein a new keyword vector $K_{new}$ is created by adding new keywords based on said activity to an existing keyword vector K;

creating a list of sentences and other information containing one or more of said conceptual keywords, wherein said set of conceptual keywords are described by a conceptual keyword vector K', wherein said conceptual keywords are conceptually related to said user-generated keywords; and automatically highlighting sentences and other information in the electronic text containing said conceptual keywords; and wherein said keyword vector K and said conceptual keyword vector K' are described by the following iterative equations after t iterations:

$$K(1)=K;$$

$$K(2)=a*K(1)+b*WC*K(1);$$

$$K(t)=K'=a*K(t-1)+b*WC*K(t-1),$$

wherein WC is a word co-occurrence matrix; wherein a and b are constants; and wherein a+b=1.

2. The computer-implemented method of claim 1, wherein said creating comprises:

for each sentence S in said text, creating a conceptual sentence vector S'; and comparing S' and K'.

3. A computer-implemented method, comprising:

selecting conceptual keywords in an electronic text on a computer with at least one processor, wherein said conceptual keywords are conceptually related to user-generated keywords comprised in keyword vector K, and wherein said keyword vector K is described by the following iterative equations after t iterations:

$$K(1)=K;$$

$$K(2)=a*K(1)+b*WC*K(1);$$

$$K(t)=K'=a*K(t-1)+b*WC*K(t-1),$$

wherein WC is a word co-occurrence matrix; wherein a and b are constants; and wherein a+b=1; and highlighting sentences and other information in the electronic text containing said conceptual keywords.

4. The computer-implemented method of claim 3, wherein a normalized conceptual keyword vector $K_{norm}'$ is described by the following equation after t iterations:

$$K_{norm}'=K'/(c*TF),$$

wherein term-frequency vector TF specifies the term frequency in the text's language of each keyword comprised in K; and wherein c is a constant.

5. The computer-implemented method of claim 1, wherein said selecting employs spreading activation and word co-occurrence.

6. The computer-implemented method of claim 1, wherein said selecting employs latent semantic analysis.

7. The computer-implemented method of claim 1, wherein different colors are used for highlighting different kinds of information relating to user interests.

8. The computer-implemented method of claim 1, wherein said highlighting is performed only on sentences and other information complying with a user-specified highlighting preference.

9. The computer-implemented method of claim 8, wherein said highlighting preference is one or more of:

a threshold formula for determining a threshold relevancy level R;

a number formula for determining the number N of sentences and other information to be highlighted on a page; and a percentage formula for determining the percentage P of sentences and other information to be highlighted on a page.

10. The computer-implemented method of claim 1, further comprising:

decreasing term weights of the existing keywords as new keywords are added.

11. The computer-implemented method of claim 1, wherein said conceptual keywords are comprised in a conceptual index of said electronic text.

12. The computer-implemented method of claim 11, wherein after a user selects an index entry, a tool tip is generated displaying passages conceptually relevant to said index entry and comprised in said electronic text.

* * * * *

UNITED STATES PATENT AND TRADEMARK OFFICE

CERTIFICATE OF CORRECTION

PATENT NO. : 7,702,611 B2
APPLICATION NO. : 11/031641
DATED : April 20, 2010
INVENTOR(S) : Ed H. Chi et al.

It is certified that error appears in the above-identified patent and that said Letters Patent is hereby corrected as shown below:

Title Page
The assignee should be amended as follows:

Assignee: ~~Xerox Corporation, Norwalk, CT (US)~~ Palo Alto Research Center, Palo Alto, CA (US)

Signed and Sealed this
Fourteenth Day of June, 2011

David J. Kappos
*Director of the United States Patent and Trademark Office*